US011940796B2

(12) United States Patent
Lambert

(10) Patent No.: US 11,940,796 B2
(45) Date of Patent: Mar. 26, 2024

(54) CONTROL SYSTEM FOR STEERABLE TOWED MARINE EQUIPMENT

(71) Applicant: ION Geophysical Corporation, Houston, TX (US)

(72) Inventor: Dale J. Lambert, Mandeville, LA (US)

(73) Assignee: DigiCourse, LLC, Harahan, LA (US)

( * ) Notice: Subject to any disclaimer, the term of this patent is extended or adjusted under 35 U.S.C. 154(b) by 788 days.

(21) Appl. No.: 16/436,780

(22) Filed: Jun. 10, 2019

(65) Prior Publication Data

US 2019/0377348 A1 Dec. 12, 2019

Related U.S. Application Data

(60) Provisional application No. 62/683,007, filed on Jun. 10, 2018.

(51) Int. Cl.
| | |
|---|---|
| G05D 1/02 | (2020.01) |
| B63B 21/66 | (2006.01) |
| B63B 49/00 | (2006.01) |
| G01V 1/38 | (2006.01) |
| G05D 1/00 | (2006.01) |

(52) U.S. Cl.
CPC .......... *G05D 1/0206* (2013.01); *B63B 21/66* (2013.01); *B63B 49/00* (2013.01); *G01V 1/3826* (2013.01); *B63B 2211/02* (2013.01)

(58) Field of Classification Search
CPC ...... G05D 1/0206; B63B 21/66; B63B 49/00; B63B 2211/02; G01V 1/3826; G01V 2210/1293; G01V 2210/1423
See application file for complete search history.

(56) References Cited

U.S. PATENT DOCUMENTS

2010/0118645 A1* 5/2010 Welker .................... B63B 21/66
367/19

FOREIGN PATENT DOCUMENTS

| GB | 2429541 A | 2/2007 |
|---|---|---|
| WO | 02103393 A2 | 12/2002 |
| WO | 2005096018 A1 | 10/2005 |

(Continued)

OTHER PUBLICATIONS

PCT International Search Report for Application No. PCT/US2019/036408 dated Oct. 9, 2019.

*Primary Examiner* — Yuen Wong
(74) *Attorney, Agent, or Firm* — Haynes and Boone, LLP

(57) ABSTRACT

A control system provides steering control commands to a steering actuator of a steering device on a piece of towed marine equipment. A memory in the control system stores setpoint data including positional values for a desired position of the piece of towed marine equipment. A control module is configured to receive the setpoint data, receive process data representing a calculated actual position of the piece of towed marine equipment; and calculate a control command for the steering actuator of the steering device based upon the setpoint data and the process data. A disturbance adjustment calculation module is configured to combine a disturbance value based upon a measured disturbance with a value of the process data and output a disturbance adjustment value. A correction calculator module adds the disturbance adjustment value to the control command to create an adjusted control command for transmission to the steering actuator.

15 Claims, 5 Drawing Sheets

(56) References Cited

FOREIGN PATENT DOCUMENTS

| WO | 2010054186 A2 | 5/2010 |
|----|---------------|--------|
| WO | 2016003292 A1 | 1/2016 |
| WO | 2019241164 A1 | 12/2019 |

* cited by examiner

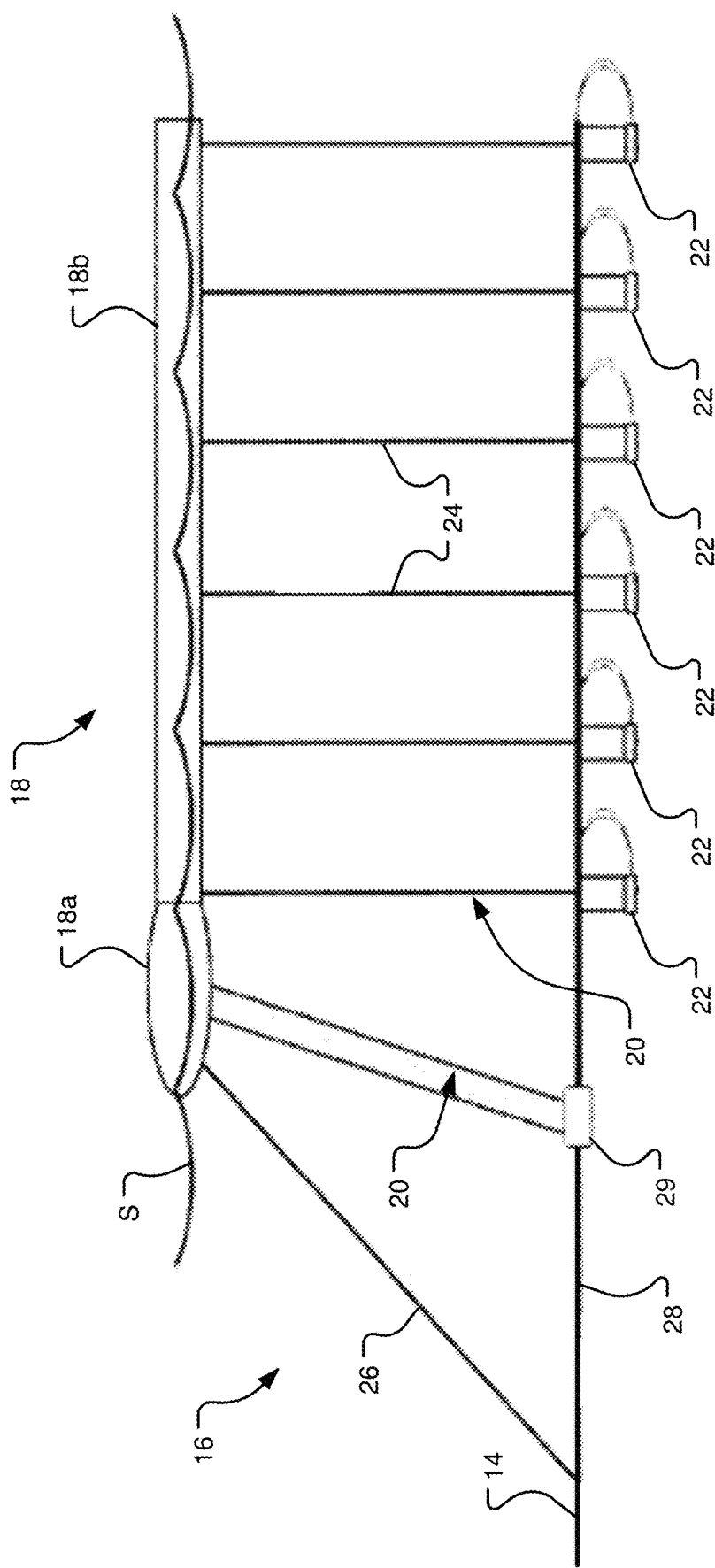

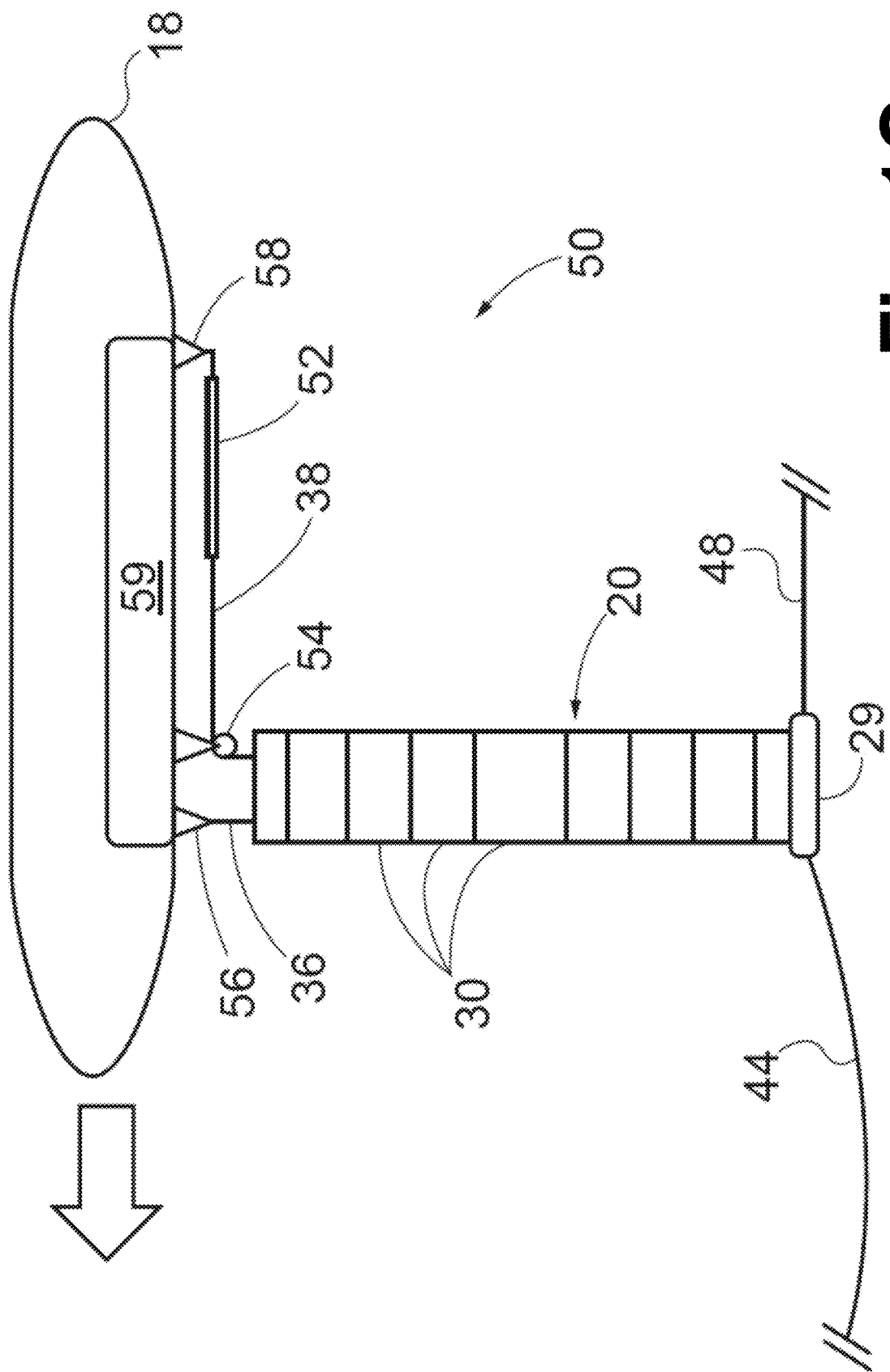

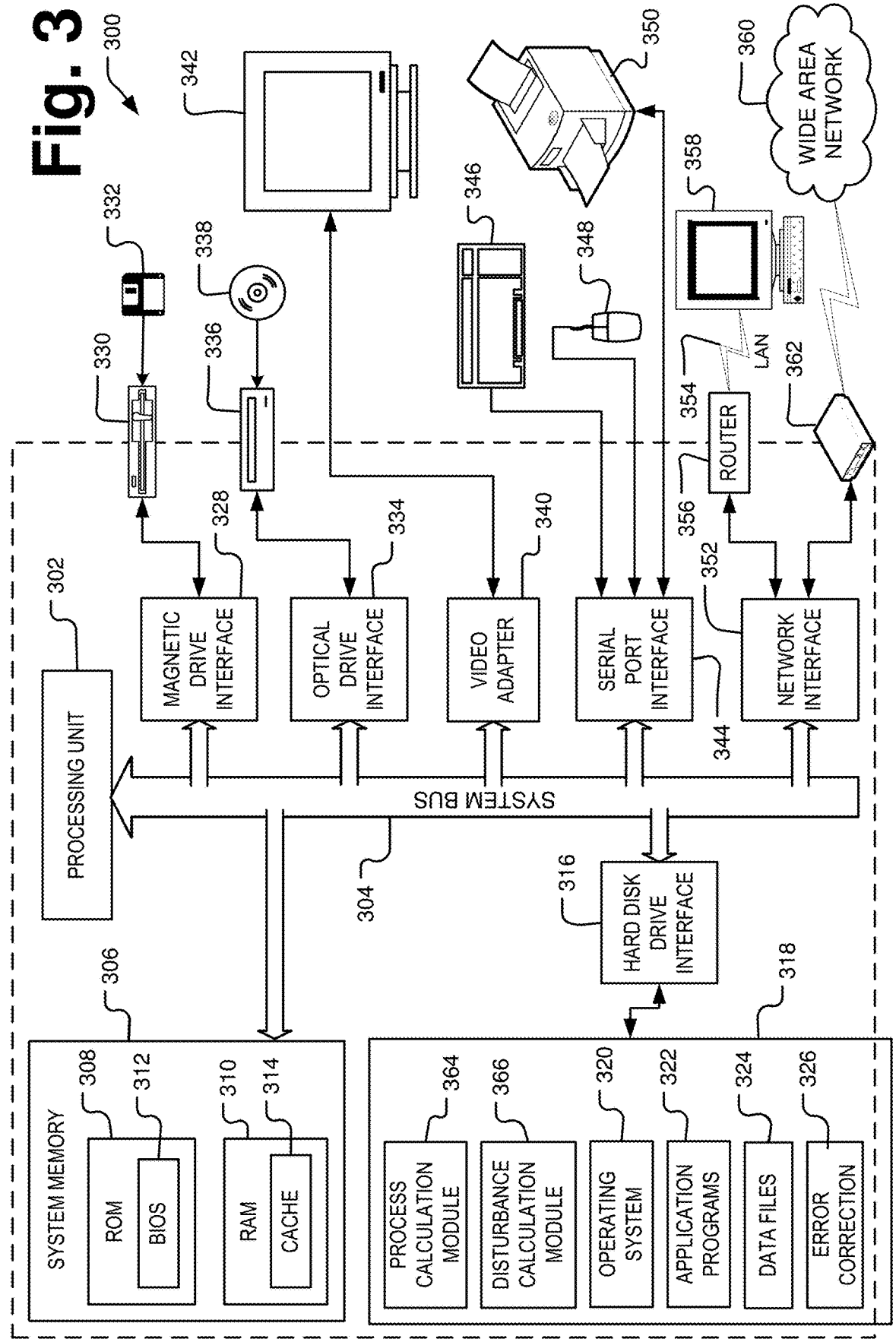

CONTROL SYSTEM FOR STEERABLE TOWED MARINE EQUIPMENT

CROSS-REFERENCE TO RELATED APPLICATIONS

This application claims priority to U.S. Provisional Patent Application No. 62/683,007 entitled "Control system for steerable towed marine equipment" filed 10 Jun. 2018, which is incorporated by reference herein, in the entirety and for all purposes.

TECHNICAL FIELD

The technology described herein relates to control systems and methods performed thereby for controlling steering systems towed marine equipment. Such towed equipment may include, but is not limited to, dynamically controlled foil and hydrofoil systems configured to position and maintain spacing between seismic sources and other elements of a marine seismic array.

BACKGROUND

Seismic arrays with sources and streamers are used to study rock strata and other structures below the surface, for example, as described in U.S. Patent Publication No. 2014/0247691, which is incorporated by reference herein in its entirety for all purposes. One or more marine vessels are typically used to tow the source and/or receiver arrays, in order to obtain relevant geological data covering a desired surface area of the ocean floor. For example, a single surface vessel may simultaneously tow both a source array and an array of seismic streamers, or different vessels can be used to tow separate source and receiver arrays. Alternatively, a towed source array can be used in conjunction with stationary receivers, for example, an array of ocean-bottom nodes, or with ocean-bottom cables deployed on the seabed.

During operation, acoustic shock waves generated by the source array propagate through the water to penetrate the ocean floor and are reflected from subsurface structures. The reflected acoustic waves are recorded as signals or seismic responses by the receivers, e.g., hydrophones and/or geophones towed behind a vessel or deployed on the ocean floor. It can be very important that the towed marine equipment such as cables with seismic sensors and other equipment closely follow a predetermined course, e.g., in order to accurately map a subsurface formation. In addition, if multiple cables are deployed behind a marine vessel it may be important to maintain a constant separation distance between the cables to ensure accuracy in the sensor readings and reduce the need for error correction.

Lateral forces are applied to maintain position and spacing of the seismic sources and other array elements as they are towed behind the vessel. The spacing depends on the number of sources and/or streamer cables that are deployed, and on the spacing between adjacent source and/or receiver components. Typically, a number of source sub-arrays or strings are deployed behind the vessel using a tow rope configuration to spread the sources over lateral distances of approximately ten to one hundred meters or more. Streamer cables are typically deployed over much larger lateral distances, for example, from one hundred meters to a kilometer or more, and may extend for several kilometers behind the tow vessel.

Lateral spacing can be achieved by deploying a paravane or diverter apparatus on a dedicated tow rope arrangement using a spreader or series of individual tether lines to provide the desired spacing between adjacent cables. Positioning devices can also be provided along each streamer cable, in order to maintain depth and/or lateral offset along the cable length. In other implementations, a dynamically controlled, steerable foil system, such as described in U.S. Patent Application Publication No. 2017/0106946 (which is hereby incorporated by reference herein in its entirety), may be used for steering and positioning such towed equipment in a marine seismic array.

Generally, control systems for the steering actuators on such steering devices attempt to correct for position errors by using feedback information from sensors on the steering devices. This feedback information is helpful for determining actual position and speed and direction of travel of the steering devices. However, such information is often not adequate to quickly counteract changes in forces that may affect the positions of cables and sensors, for example, changes in currents, changes in speed and direction of the tow vessel, or other disturbances. Thus, the cables and sensors in a marine array may be out of position from a desired position for a longer period of time than acceptable due to such disturbances, which take a longer period of time or more cycles to correct by reliance solely on feedback loop data.

The information included in this Background section of the specification, including any references cited herein and any description or discussion thereof, is included for technical reference purposes only and is not to be regarded subject matter by which the scope of the invention as defined in the claims is to be bound.

SUMMARY

In one exemplary implementation, a control system provides steering control commands to a steering actuator of a steering device on a piece of towed marine equipment. A memory in the control system stores setpoint data including positional values for a desired position of the piece of towed marine equipment. A control module is configured to receive the setpoint data, receive process data representing a calculated actual position of the piece of towed marine equipment; and calculate a control command for the steering actuator of the steering device based upon the setpoint data and the process data. A disturbance adjustment calculation module is configured to combine a disturbance value based upon a measured disturbance with a value of the process data and output a disturbance adjustment value. The disturbance data is different than calculated positional data or measured positional data of the piece of towed marine equipment. A correction calculator module adds the disturbance adjustment value to the control command to create an adjusted control command for transmission to the steering actuator.

In another exemplary implementation, a method in a control system for provides steering control commands to a steering actuator of a steering device on a piece of towed marine equipment. Setpoint data, including positional values for a desired position of the piece of towed marine equipment is accessed from storage within a memory in the control system. Process data representing a calculated actual position of the piece of towed marine equipment is received. A control command for the steering actuator of the steering device is calculated within a controller based upon the setpoint data and the process data. A disturbance value of a measured disturbance is combined with a value of the process data to calculate a disturbance adjustment value. The disturbance adjustment value is added to the control command create an adjusted control command. The adjusted control command is transmitted to the steering actuator.

In a further exemplary implementation, a method in a control system provides steering control commands to a steering actuator of a steering device on a piece of towed marine equipment. Setpoint data including positional values for a desired position of the piece of towed marine equipment is received in the control system. Measured disturbance data affecting a course of the piece of towed marine equipment is further received in the control system. The disturbance data is different than calculated positional data or measured positional data of the piece of towed marine equipment. An impact of the measured disturbance data on a course of the piece of towed marine equipment as compared to the setpoint data is calculated by invoking a first mathematical model. A control command to the steering actuator of the steering device is adjusted based upon the calculated impact of the measured disturbance data.

In any of the implementations disclosed herein, the measured disturbance data may include one or more of the following: a heading of a vessel towing the piece of towed marine equipment; a speed of the vessel towing the piece of towed marine equipment; a speed of a current affecting the vessel or the piece of towed marine equipment in a body of water in which the vessel and piece of towed marine equipment are deployed; or a direction of a current affecting the vessel or the piece of towed marine equipment in a body of water in which the vessel and piece of towed marine equipment are deployed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 1B is a schematic side view of a source array illustrating representative configurations of the foil steering system.

FIG. 1C is a schematic illustration of a cable adjustment mechanism for the foil system.

FIG. 3 is a schematic illustration of an exemplary computer system configuration for implementing the process functions of and calculations performed by the control system.

DETAILED DESCRIPTION

In the following disclosure, reference is made to a number of exemplary embodiments or specific implementations of the claimed invention. However, it should be understood that the claims are not limited to specific described embodiments. Instead, any combination of the following features and elements, whether related to different embodiments or not, is contemplated to implement and practice the claimed invention. Furthermore, the various embodiments may provide numerous advantages over the prior art. However, although such embodiments may achieve advantages over other possible solutions and over the prior art, whether or not a particular advantage is achieved by a given embodiment is not limiting of the claims. Thus, the following aspects, features, embodiments, and advantages are merely illustrative and are not considered elements or limitations of the appended claims except where explicitly recited in the claims. Likewise, reference to "the invention" shall not be construed as a generalization of any inventive subject matter disclosed herein, and shall not be considered to be an element or limitation of the appended claims except where explicitly recited in the claims.

Figure 1A:
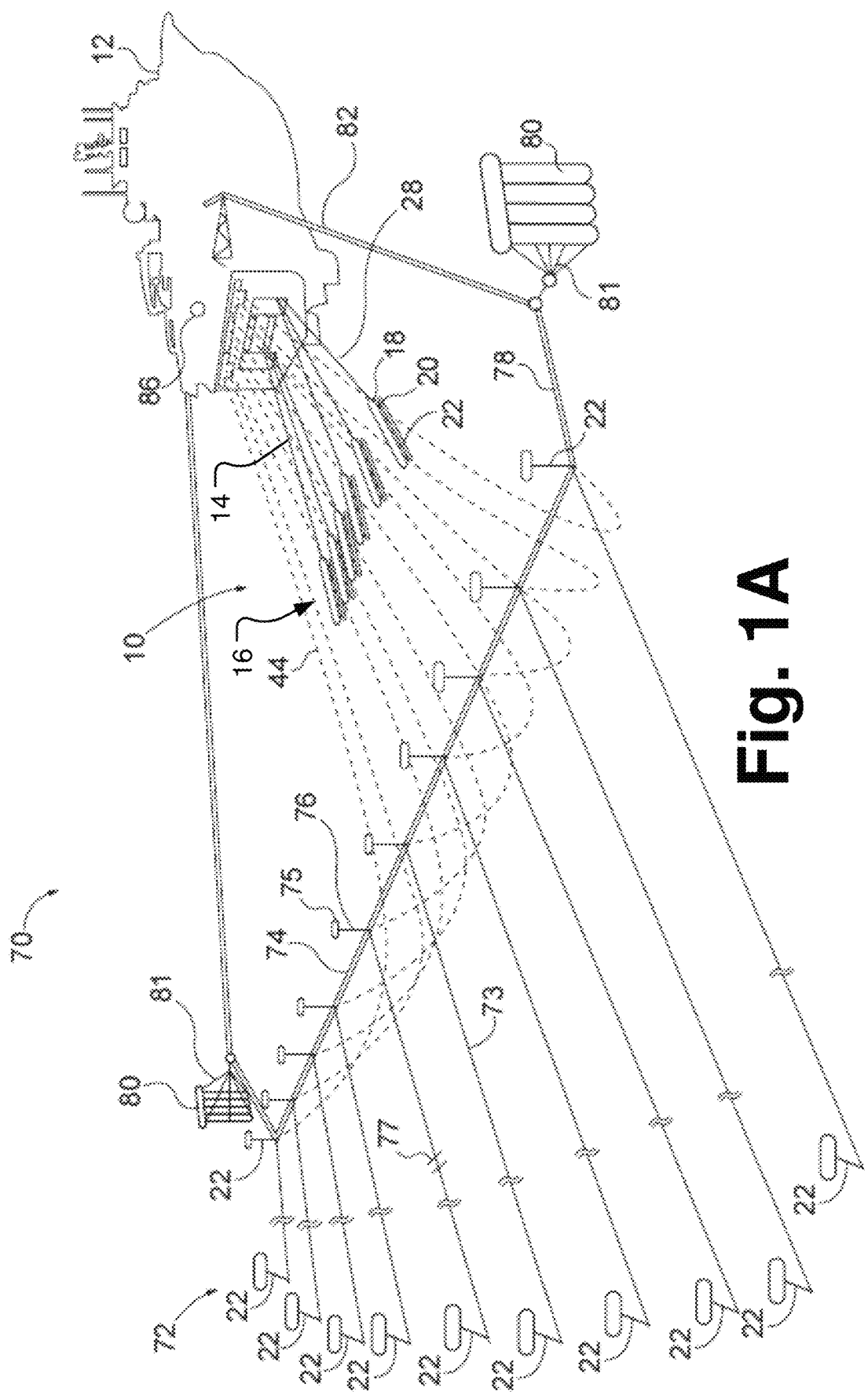
FIG. 1A is a schematic view of a representative towed seismic array utilizing one or more dynamically controlled foil systems for steering source and/or streamer components.

A schematic illustration of a representative towed seismic array 70 utilizing one or more dynamically controlled foil systems 20 for steering source and/or streamer components is depicted in FIG. 1A. The seismic array 70 includes a source array 10 and a streamer array 72 towed by a seismic survey craft or other vessel 12. Tow lines or cables 14 are coupled to the vessel 12 at one end and attached to a sub-array or string 16 of seismic sources at the other. For example, each tow cable 14 can be coupled to a series of air guns or other sources suspended from a head float, buoy, or other flotation apparatus 18.

The source array 10 is directed along a navigational course or sail line by the tow vessel 12. Within the source array 10, the relative positions of the individual sources (or sets of sources) can be controlled by providing a dynamically steerable foil system for each floatation apparatus 18, or for groupings of floatation apparatus 18, as described herein. The source array 10 includes a number of head/sausage type floats 18 from which individual seismic sources 22 are suspended with umbilical cables 28 for power, data, and pneumatic connections to the survey vessel 12.

The streamer array 72 includes a plurality of individual streamer cables 73 with seismic receivers distributed along each cable length to observe the reflected signals from the seismic sources 22. The streamer cables 73 are coupled to tow lines or other submerged cables 44 along a spreader or separation rope 74, which is suspended at a streamer depth below corresponding head buoys 75 using tag lines or depth ropes 76. The streamers 73 may extend many kilometers from the head buoys 75 toward a corresponding number of tail buoys 77 at the aft end. (Thus, FIG. 1A is not to scale).

As shown in FIG. 1A, the separation rope 74 is laterally extended by attachment to spur lines 78, which are coupled to paravanes or diverters 80 via deflector straps 81. Wide tow ropes 82 run between paravanes or diverters 80 and the tow vessel 12. The dynamically controllable foil system 20 may be provided on or in place of one or more streamer tag lines or depth ropes 76, extending from the head buoys 75 down to the forward end of the streamer cables 73. The steerable foil systems 20 may also be provided between the tail buoys 77 and the aft ends of the streamer cables 73 and in intermediate streamer locations.

The seismic survey vessel 12 is provided with a navigational system 86 including one or more foil steering modules configured to communicate with the dynamically steerable foil systems 20 deployed variously in the source array 10 and the streamer array 72, and/or among the other components of the towed seismic array 70. The foil systems 20 can also be utilized, in addition to source steering, to independently steer and laterally position streamers 73 with or without a discrete spreader or separation rope 74. The steerable foil systems 20 can also be provided in lieu of diverters or paravanes 80, for example in the end streamer positions as shown in FIG. 1A, without the need for a separate spur line 78 and wide tow rope 82. Alternatively, the steerable foil systems 20 can be used within or provided in place of one or more diverters or paravanes 80 using a similar spur cable configuration.

More generally, the foil system 20 can be utilized for steering a wide range of submerged cable and float arrangements, suitable not only to seismic source and streamer steering but also for ocean-bottom cable and node deployment, side scan surveys, and sonar applications. The dynamically steerable foil system 20 may also be adapted to more generalized (non-seismic) uses including generic paravane, diverter and hydrofoil systems. Use with the paravane/diverter cable or P-cable and ocean bottom cables are additional options.

FIG. 1B is a side view of a source array 10 illustrating representative configurations for dynamically controlled foil system 20. In this particular example, a sub-array or string 16 of individual air guns or other seismic sources 22 is suspended from the floatation apparatus 18 via suspension ropes 24, which determine the depth of sources 22 below surface S. Suspension ropes 24 are coupled to selected portions of the float 18, e.g., between head float section 18a and the trailing end of sausage float section 18b.

The float 18 is towed along the surface S via the tow cable 14, which is coupled to the head float section 18 a via a tow leader 26. The tow cable 14 typically comprises an umbilical 28 with data and power connections for seismic sources 22 and is connected to the foil system 20 at a cable connector 29. In air gun applications, the umbilical 28 may include a pneumatic hose or conduit configured to provide pressurized air to the seismic sources 22 in order to generate acoustic shock waves when fired in response to direction by a control system. The shock waves (or other seismic signals) propagate from the seismic sources 22 through the water or other medium, penetrating the ocean floor and reflecting back from subsurface features. The reflected signals are recorded by seismic sensors (e.g., hydrophones or geophones in a streamer cable or ocean-bottom array) and processed to generate geophysical image data representing the subsurface structures.

As shown in FIG. 1B, the dynamically controlled foil system 20 can be coupled between the floatation apparatus 18 and a submerged portion of the tow cable 14, e.g., at the cable connector 29 between the head float 18 a and the umbilical portion 28 of the tow cable 14, aft of the tow leader 26 and forward of the seismic sources 22. Alternatively, the submerged end of the foil system 20 can be coupled to one of the seismic sources 22 (e.g., to the first gun plate in the string).

In these configurations, the foil system 20 is configured to steer the head float 18a by generating hydrodynamic lift forces, which are controlled to achieve the desired lateral positioning of the seismic sources 22 within the source array 16 and with respect to the tow vessel 12. Alternatively, one or more foil systems 20 can be coupled to the sausage float section 18b and positioned along (or in place of) any of a number of suspension ropes or cables 24, for example, in a forward position at the lead seismic source 22, in an intermediate position between individual seismic sources 22, or in an aft position at (or trailing behind) the last seismic source 22.

A schematic illustration of a representative the adjustment mechanism 50 for the dynamic foil system 20 is shown in greater detail in FIG. 1C. A turnbuckle 52 and a pulley 54, ratchet, winch, or similar cable guide and feed mechanism may be mounted to the floatation apparatus 18, e.g., between the top end of the aft control cable 38 and an aft anchor point 58 on the back or rear section of the floatation apparatus 18 (in the trailing edge direction of the foil sections 30). The forward cable 36 is mounted to a forward anchor 56 attached to the front section of the floatation apparatus 18 (in the leading edge direction of the foil sections 30).

The adjustment mechanism 50 can be configured for adjusting either the forward cable 36 or the aft cable 38; both embodiments are encompassed. Another option is to use an adjustment mechanism 50 that provides differential adjustments to both forward and aft cabled 36, 38; e.g., by shortening one cable while lengthening the other at the same time. In some designs a single control cable may be used, extending from the forward cable anchor 56 down along a forward cable section 36, then passing through a cable return or wrapping or inflecting around a cable connector 29 attached to a submerged cable 44, and back up along an aft cable section 38 to the aft anchor 58 through the pulley 54. Alternatively, separate forward and aft control cables 36, 38 may be provided, e.g., individually attached at the submerged cable connector 29. The submerged cable 44 can be provided either as a tow line for a streamer cable 48 or as an umbilical for a source gun array.

A control device 59 for the adjustment mechanism 50 may be located at either the top or bottom end of the foil system 20, for example, inside the floatation apparatus 18. Suitable control devices 59 include processor, memory, and software components configured to direct the adjustment mechanism 50 to selectively vary the length and/or tension in the forward and aft cables 36, 38, in order to regulate the lift and steering forces generated by the foil system 20 by changing the angle of attack along individual foil sections 30. For example, the control device 59 may be configured to control an electric motor or similar drive in order to actuate the adjustment mechanism 50, providing for automated steering by adjustment of the relative length and tension in the forward and aft control cables 36, 38. Other control options include, but are not limited to, hydraulic and pneumatically controlled ram or piston mechanisms, electric winch drives, and motor-driven rack and pinion arrangements.

In the context of a seismic survey as described above, a number of seismic energy source devices and/or a number of sensor nodes may be attached along the length of cables deployed and towed behind the marine vessel. Each of the cables, or the seismic equipment attached to the cables, may have a steering device associated therewith in order to adjust the position of the cable or seismic devices within the water. In some implementations, it may be very important that the towed marine equipment such as the cables with seismic equipment closely follow a predetermined course (e.g., in order to accurately map a subsurface formation). In addition, if multiple cables are deployed behind a marine vessel it may be important to maintain a constant separation distance between the cables. To meet these needs, steering mechanisms may be attached to each cable and further or alternatively attached to the equipment towed by the cable.

The foil systems 20 are just one exemplary implementation of a steering mechanism that may be employed to steer and position cables, seismic energy sources, sensor nodes, buoys and floats in the seismic array, etc. Other steering mechanisms for attachment to such sensor array components exist. These may include paravanes, hydrofoils, rudders, wings, elevators, and various other devices. The orientations of each of these devices while being towed through the water may be adjusted for steering. Such adjustments may be made by increasing or decreasing tension on control cables (i.e., making them more taught or more slack), engaging actuators to physically move a steering element; engaging motors to drive rotating elements, etc. In each case, the steering mechanisms are controlled by signals calculated to alter their orientation appropriately to maintain a proper course for the seismic array elements within the water. These signals are determined by sophisticated navigation and control systems that work in concert with the navigation of the marine vessel in order to ensure that the elements of the seismic array stay on course and maintain proper separation distances between adjacent elements.

Figure 2:
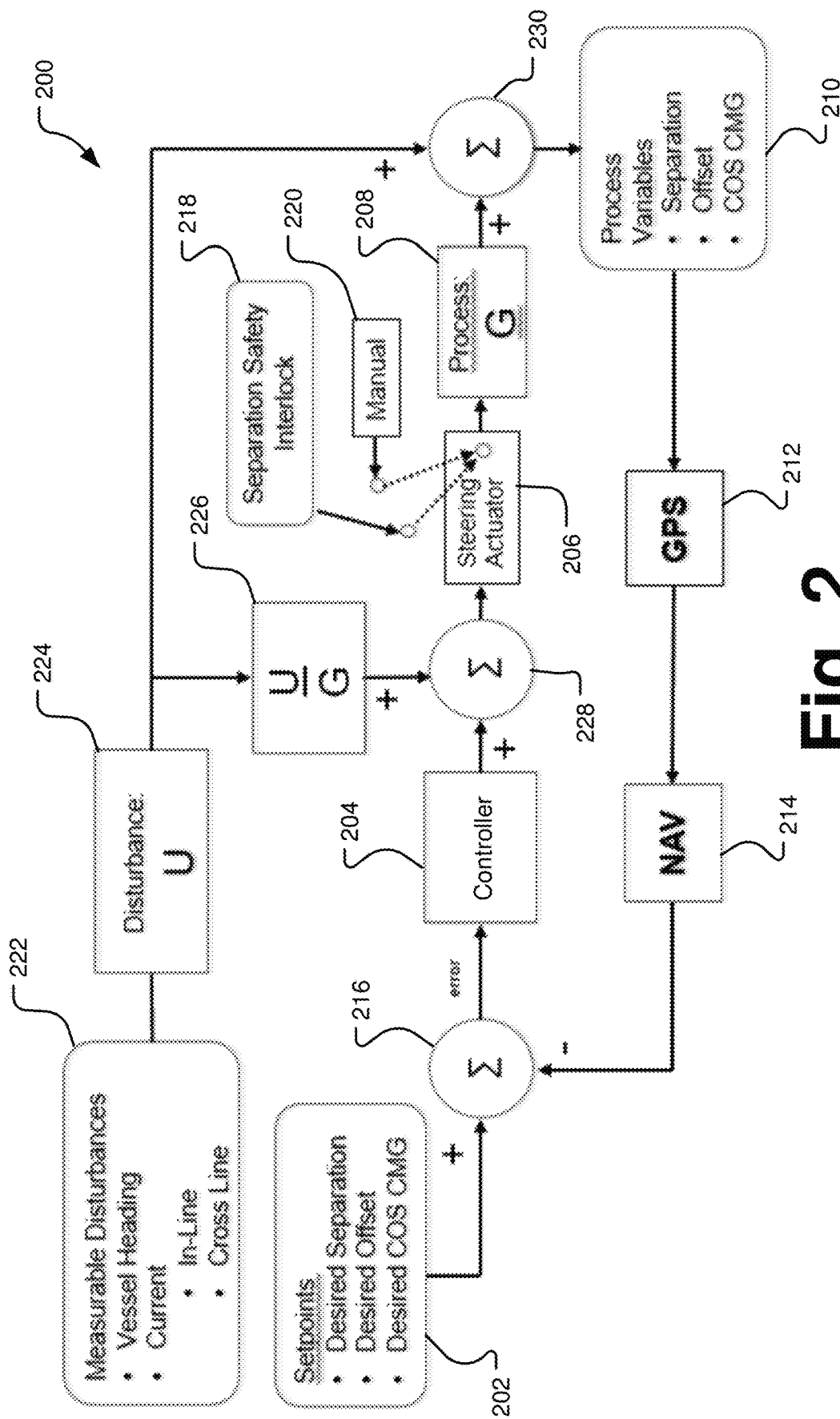
FIG. 2 is a schematic illustration of an embodiment of a steering control system incorporating a feed forward loop to account for measurable disturbances that can affect the position of steerable towed seismic equipment.

FIG. 2 is a schematic diagram of an implementation of a control system 200 for use in steering towed marine equipment. As indicated in FIG. 2, and as is the case with most marine steering systems, a number of set points or control system input variable values may be defined and input into the control system 200 as a starting point as indicated by data input 202. For example, when controlling the steering of towed marine equipment, set points may include desired separation distances between cables or other components of the steerable towed equipment, a desired offset or minimal offset from the plotted course of the center of the marine vessel towing the equipment, or a desired center-of-source/course-made-good (COS/CMG) identified as a center point of a towed seismic array.

These initial values and others may be provided to a controller 204. The controller 204 may be any type of control module capable of incorporating feedback, for example, a state-variable controller, a proportional integral derivative (PID) controller, a multi-input/multi-output controller, etc. The controller 204 receives the input values for the course and calculates particular steering instructions that are translated into a specific control command for the particular steering mechanism attached to a cable or other marine equipment being towed. The steering instructions and control commands are specific to the type of steering mechanism being controlled, the type of towed equipment connected to the steering device, and the particular course that the towed equipment is intended to follow.

The steering instructions generated by the controller 204 are then forwarded to a steering actuator 206. The steering actuator 206 may be any one of a number of devices used to control the orientation of or steering of towed marine equipment. For example, in some instances the steering actuator 206 may be a switch to a motor driven propeller that is turned on and off and oriented in an appropriate direction to effect the steering command. In other instances the steering actuator 206 may be a mechanical device that orients a rudder, fin, or other hydrofoil in a certain direction to steer the associated cable or other marine equipment in a desired direction as the cable is pulled behind the vessel.

Once a steering control command has been implemented, the control system 200 may invoke a mathematical model to compute the anticipated results of the steering action as indicated by process module 208. The process (G) module 208 may compute as an output a process variable data set 210 of the same type as the set point variables 202. For example, the process (G) module 208 may compute a modeled position and separation distance between elements of the towed equipment as expected in response to the prior steering input. Additionally or alternatively, an offset process variable may be computed to determine the likely actual course for the center of the vessel. Additionally, or alternatively, the process (G) module 208 may calculate an anticipated COS/CMG position of a center of all towed equipment in an array behind the vessel after the steering command is implemented. Other process variables may similarly be calculated according to mathematical models programmed in the process (G) module 208. The values of the variables in the process variables data set 210 become the primary input into a feedback loop for the control system 200 in order to provide a basis for error correction.

In addition to the calculated process variables data set 210, additional geographic positional information may be determined for use in error correction of course aberrations. For example, global positioning satellite (GPS) information 212 may be collected from receivers mounted on the towed marine equipment. The GPS information 212 and the process variables values 210 may be forwarded to a navigation system 214. The navigation system 214 uses the data from the GPS 212 and process variable information 210 to calculate an estimated geographic position of the towed marine equipment. The calculated estimated position may be compared to a pre-plotted course for the towed marine equipment within the navigation system 214.

The calculated navigation information is then forwarded to an error calculator 216. The error calculator 216 also receives the original set point information and course information from the setpoint dataset 202 and computes a difference between the desired course and position of each of the towed marine equipment elements and the computed actual positions in process variable values output by the navigation system 214. If there is a difference between these values, an error is registered and the difference values are input in to the controller 204 for calculation of new control commands for the steering actuator 206 intended correct any differences between the planned course and the actual course. In this manner a feedback loop is created for error correction of the steering control of the towed marine equipment.

It may be noted that the control system 200 may also include a safety override. For example, a separation safety interlock 218 may be connected with the steering actuator 206 in order to interrupt or deactivate the steering actuator 206 in the event that two or more pieces of the towed marine equipment are determined to be too close together, in order to avoid a risk of entanglement between and potential damage to the towed marine equipment. In addition, a manual override module 220 may be provided within the control system 200 to allow manual control of the steering actuator 206.

This portion of the control system 200 for use with steering towed marine equipment thus described provides steering control and error correction through a feedback loop. However, when limited to this configuration, the control system 200 may not react quickly enough to changes in the environment or more significant course corrections of the marine vessel towing the marine equipment. Because of the slow reaction time of the feedback loop, it may take an excessive amount of time for the towed marine equipment to return to a pre-planned course position. In the context of conducting marine seismic surveys, source energy and sensing equipment that are substantially out of position can lead to poor survey results. For these reasons, a forward feedback control loop is further contemplated and implemented within the control system 200.

As indicated in FIG. 2, a number of measurable disturbances that are separately notable and recordable may have significant impacts upon the course of a piece of steerable towed marine equipment. Such disturbances may include a significant change in the heading of the marine vessel towing the steerable towed marine equipment. Ocean currents can also create measurable effects on the course of the towed marine equipment as the equipment passes through the current. For example, inline currents (i.e., currents flowing in a parallel direction to the course of the towed equipment) can cause increased drag on or greater speed of the towed equipment depending upon the current direction. Crossline currents can push the towed marine equipment significantly off course either to starboard or to port. In many instances, these and other kinds of disturbances may be known or noticed in advance of their imparting noticeable effect upon the steerable towed marine equipment.

For example, if a vessel heading or speed changes, e.g., to counteract currents or wind, such information would be input into the marine vessel control system and may be made immediately available to each control system 200 for each of the steering actuators 206 for the steerable towed marine equipment. Similarly, the marine vessel or the steerable towed equipment itself may include current sensors, for example, an acoustic Doppler profiler that measures the speed and direction of underwater currents which may have an effect on the steerable towed marine equipment. Such information can be collected and provided as an input into a forward feed control loop in the control system 200 as indicated by data set 222. This information may be provided as input variables to a mathematical model of disturbance (U) as indicated by disturbance module 224.

The disturbance module 224 may invoke preconfigured models to calculate the impact of any disturbance values on the process variables input into the feedback loop. Such models may be developed in advance, for example, through experimental trials and recordation of effects of changes in speed and heading of the vessel in response to wind and currents and the corresponding effects on sensor positions in a towed array. Artificial intelligence, neural networks, fuzzy logic, and other modeling techniques may be employed to build models responsive to various disturbance conditions encountered by or caused by vessels towing arrays in such trials.

Output of the calculated disturbance values may be used as input for correction of control signals to the steering actuator 206 and as input within the feedback loop of the control system 200. In a first control path, a disturbance value may be used as an anticipatory action to immediately change the control input to the steering actuator 206. As indicated in disturbance adjustment calculation module 226, a quotient of a disturbance value (U) and the most recent process value (G) may be added to the output of the controller 204 by a correction calculator 228. A percentage or portion of the disturbance value (U) is thus used to immediately effect changes in the control signal to the steering actuator 206 to respond to measurable disturbances before the effects of the measurable disturbances are recognized in the standard feedback loop. This type of proactive correction thus helps better maintain the desired position of the steerable towed equipment. In addition, calculated disturbance values (U) may be output to enter the feedback loop and be added to corresponding calculated process values (G) by a feedback correction calculator 230. In this manner the effect of measurable disturbances is taken into account into the feedback loop to help more accurately calculate the navigational position of the steerable towed marine equipment. Thus, input values provided to the controller 204 may generate commands to the steering actuator 206 that will result in more stable and accurate steering and positioning of the steerable towed marine equipment.

An exemplary computer system 300 for implementing the processes performed by the control system 200 described above is depicted in FIG. 3. The computer system 300 may be a personal computer (PC), a workstation, a server, a mainframe computer, a distributed computer a portable notebook or tablet computer, or functionally distributed across a number of computers and pieces of specialized control equipment (e.g., the controller 204 and the navigation module 214), each with internal processing and memory components as well as interface components for connection with external input, output, storage, network, and other types of peripheral devices. The computer system 300 of FIG. 3 is intended to be a generic representation of computers and control equipment that may include some or all of the components depicted and described. Internal components of the computer system in FIG. 3 are shown within the dashed line and external components are shown outside of the dashed line. Components that may be internal or external are shown straddling the dashed line.

In any embodiment or component of the control system described herein, the computer system 300 includes a processor 302 and a system memory 306 connected by a system bus 304 that also operatively couples various system components. There may be one or more processors 302, e.g., a single central processing unit (CPU), or a plurality of processing units, commonly referred to as a parallel processing environment (for example, a dual-core, quad-core, or other multi-core processing device). The system bus 304 may be any of several types of bus structures including a memory bus or memory controller, a peripheral bus, a switched-fabric, point-to-point connection, and a local bus using any of a variety of bus architectures. The system memory 306 includes read only memory (ROM) 308 and random access memory (RAM) 310. A basic input/output system (BIOS) 312, containing the basic routines that help to transfer information between elements within the computer system 300, such as during start-up, is stored in ROM 308. A cache 314 may be set aside in RAM 310 to provide a high speed memory store for frequently accessed data.

A hard disk drive interface 316 may be connected with the system bus 304 to provide read and write access to a data storage device, e.g., a hard disk drive 318, for nonvolatile storage of applications, files, and data. A number of program modules and other data may be stored on the hard disk 318, including an operating system 320, one or more application programs 322, and data files 324 (for example, the setpoint values and the process values). In an exemplary implementation, the hard disk drive 318 may store the process calculation module 364, the disturbance calculation module 366, and any number of error correction calculators 326. Note that the hard disk drive 318 may be either an internal component or an external component of the computer system 300 as indicated by the hard disk drive 318 straddling the dashed line in FIG. 3. In some configurations, there may be both an internal and an external hard disk drive 318.

The computer system 300 may further include a magnetic disk drive 330 for reading from or writing to a removable magnetic disk 332, tape, or other magnetic media. The magnetic disk drive 330 may be connected with the system bus 304 via a magnetic drive interface 328 to provide read and write access to the magnetic disk drive 330 initiated by other components or applications within the computer system 300. The magnetic disk drive 330 and the associated computer-readable media may be used to provide nonvolatile storage of computer-readable instructions, data structures, program modules, and other data for the computer system 300.

The computer system 300 may additionally include an optical disk drive 336 for reading from or writing to a removable optical disk 338 such as a CD ROM or other optical media. The optical disk drive 336 may be connected with the system bus 304 via an optical drive interface 334 to provide read and write access to the optical disk drive 336 initiated by other components or applications within the computer system 300. The optical disk drive 330 and the associated computer-readable optical media may be used to provide nonvolatile storage of computer-readable instructions, data structures, program modules, and other data for the computer system 300.

A display device 342, e.g., a monitor, a television, or a projector, or other type of presentation device may also be connected to the system bus 304 via an interface, such as a video adapter 340 or video card. Similarly, audio devices, for example, external speakers or a microphone (not shown), may be connected to the system bus 304 through an audio card or other audio interface (not shown).

In addition to the monitor 342, the computer system 300 may include other peripheral input and output devices, which are often connected to the processor 302 and memory 306 through the serial port interface 344 that is coupled to the system bus 306. Input and output devices may also or alternately be connected with the system bus 304 by other interfaces, for example, a universal serial bus (USB), an IEEE 1394 interface ("Firewire"), a parallel port, or any number of input/output hardware configurations and protocols. A user may enter commands and information into the computer system 300 through various input devices including, for example, a keyboard 346 and pointing device 348, for example, a computer mouse. Other input devices (not shown) may include, for example, a joystick, a game pad, a tablet, a touch screen device, a satellite dish, a scanner, antennae, GPS devices, a facsimile machine, a microphone, a digital camera, and a digital video camera.

Other output devices may include a printer 350 and one or more loudspeakers 370 for presenting the audio performance of the sender. Further output devices (not shown) may include, for example, a plotter, a photocopier, a photo printer, a facsimile machine, and a press. In some implementations, several of these input and output devices may be combined into single devices, for example, a printer/scanner/fax/photocopier. It should also be appreciated that other types of computer-readable media and associated drives for storing data, for example, magnetic cassettes or flash memory drives, may be accessed by the computer system 300 via the serial port interface 344 (e.g., USB) or similar port interface.

The computer system 300 may operate in a networked environment using logical connections through a network interface 352 coupled with the system bus 304 to communicate with one or more remote devices. The logical connections depicted in FIG. 3 include a local-area network (LAN) 354 and a wide-area network (WAN) 360. These logical connections may be achieved by a communication device coupled to or integral with the computer system 300. As depicted in FIG. 3, the LAN 354 may use a router 356 or hub, either wired or wireless, internal or external, to connect with remote devices, e.g., a remote computer 358, similarly connected on the LAN 354. The remote computer 358 may be another personal computer, a server, a client, a peer device, or other common network node, and typically includes many or all of the elements described above relative to the computer system 300. In the context of the seismic survey equipment, each of the sensor nodes may be configured to wirelessly connect with the LAN 354 upon retrieval from deployment to download collected data for storage and processing.

To connect with a WAN 360, the computer system 300 typically includes a modem 362 for establishing communications over the WAN 360. Typically the WAN 360 may be the Internet. However, in some instances the WAN 360 may be a large private network spread among multiple locations, or a virtual private network (VPN). The modem 362 may be a telephone modem, a high speed modem (e.g., a digital subscriber line (DSL) modem), a cable modem, a satellite modem, or similar type of communications device. The modem 362, which may be internal or external, is connected to the system bus 318 via the network interface 352. In alternate embodiments the modem 362 may be connected via the serial port interface 344. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A control system for providing steering control commands to a steering actuator of a marine seismic component, the control system comprising:
    a marine vessel;
    a plurality of spaced apart cables extending from the marine vessel, wherein each of the plurality of spaced apart cables is attached to a separate towed marine seismic component;
    one or more memory devices storing positional setpoint data for at least one towed marine seismic component;
    at least one processor operable to execute a plurality of instructions stored in the one or more memory devices to:
    receive process data representing a calculated actual position of the at least one towed marine seismic component being towed by the marine vessel;
    compute a difference between the positional setpoint data and the received process data;
    generate a control command for steering of the at least one towed marine seismic component based on the computed difference between the positional setpoint data and the process data;
    generate a disturbance value based on a measured disturbance, wherein the measured disturbance comprises one or more of a heading of the marine vessel, a speed of the marine vessel, a speed of a current affecting the marine vessel, or a direction of a current affecting the marine vessel, and wherein a percentage or portion of the measured disturbance value is used to immediately effect changes in control signal to the steering actuator to respond to measurable disturbances before effects of the measurable disturbances are recognized in a feedback loop;
    combine the disturbance value with a value of the process data to produce a disturbance adjustment value in the feedback loop;
    add the disturbance adjustment value to the control command to create an adjusted control command;
    provide the adjusted control command to the steering actuator of the at least one towed marine seismic component to implement the control command; and
    following the implementation of the adjusted control command, utilize the disturbance adjustment value and results of the implemented adjusted control signal on the at least one towed marine seismic component to generate subsequent process data.

2. The control system of claim 1 wherein the plurality of instructions are further operable to:
    generate an adjusted control signal for each of a first towed marine seismic component and a second towed marine seismic component, each of the first and second towed marine seismic components on a separate spaced apart cable;
    determine a distance between the first towed marine seismic component and the second towed marine seismic component; and
    when the determined distance between the first towed marine seismic component and the second towed marine seismic component is less than a predetermined separation distance, interrupt use of the adjusted control signal to steer at least one of the first towed marine seismic component and second towed marine seismic component.

3. The control system of claim 2, further comprising:
    a navigation system comprising a processor that determines a geographic position of the the at least one towed marine seismic component; and
    a global positioning satellite (GPS) receiver configured to provide GPS location information to the navigation system for use in determining the geographic position of the first towed marine seismic component and the second towed marine seismic component.

4. The control system of claim 1, wherein the measured disturbance is a change in the heading of the marine vessel.

5. The control system of claim 1, wherein the disturbance adjustment value is a quotient with the disturbance value in a numerator and the process data value in a denominator.

6. The control system of claim 1, wherein the measured disturbance is ocean currents about the marine vessel.

7. The control system of claim 1 wherein the plurality of instructions are further operable to:
    following adjustment of the control signal, compare a geographic position of the at least one towed marine seismic component to the positional setpoint data to determine an error value with respect to a position of the at least one towed marine seismic component and utilize the error value and the disturbance value to generate the subsequent process data.

8. A method of seismic data collection, the method comprising:
    determining positional setpoint data for at least one towed marine seismic component;
    utilizing a marine vessel to initiate towing of a plurality of spaced apart cables, each attached to a separate towed seismic component one of the plurality of which is one of the at least one towed seismic component;
    receiving a first set of process data representing a calculated actual position of the at least one towed marine seismic component;
    computing a difference between the positional setpoint data and the received first set of process data;
    generating a control command for steering of the at least one towed marine seismic component based on the computed difference between the positional setpoint data and the first set of process data;
    adjusting the control signal based on a forward feedback loop, wherein the forward feedback loop comprises measuring a disturbance;
    generating a disturbance value based on the measured disturbance, wherein the measured disturbance comprises one or more of a heading of the marine vessel, a speed of the marine vessel, a speed of a current affecting the marine vessel, or a direction of a current affecting the marine vessel, and wherein a percentage or portion of the measured disturbance value is used to immediately effect changes in control signal to the steering actuator to respond to measurable disturbances before effects of the measurable disturbances are recognized in a feedback loop;

combining the disturbance value with a value of the processed data to produce a disturbance adjustment value in the feedback loop;

adding the disturbance adjustment value to the control command to create an adjusted control command;

individually steering the at least one towed marine seismic component via a dynamically steerable system utilizing the adjusted control command; and following adjustment of the control command, utilizing the disturbance value to generate a second set of process data and repeating the steps of receiving utilizing the second set of process data.

9. The method of claim 8, wherein the measured external disturbance is a change in the heading of the marine vessel.

10. The method of claim 8, further comprising:

generating an adjusted control signal for each of a first towed marine seismic component and a second towed marine seismic component;

determining a distance between the first towed marine seismic component and the second towed marine seismic component;

when the determined distance between the first towed marine seismic component and the second towed marine seismic component is less than a predetermined separation distance, interrupting use of the adjusted control signal to steer at least one of the first towed marine seismic component and second towed marine seismic component.

11. The method of claim 8, wherein the disturbance adjustment value is a quotient with the disturbance value in a numerator and the process data value in a denominator.

12. The method of claim 8, further comprising:

following adjustment of the control signal, comparing a geographic position of the at least one towed marine seismic component to the positional setpoint data to determine an error value with respect to a position of the at least one towed marine seismic component; and utilizing the error value and the disturbance value to generate the second set of process data.

13. A method of seismic data collection, the method comprising:

(a) determining positional setpoint data for a first towed marine seismic component and a second towed marine seismic component;

(b) utilizing a marine vessel to tow a first cable coupled to the first towed marine seismic component and a second cable coupled to the second towed marine seismic component;

(c) receiving a first set of process data representing a calculated actual position of each of the first and second towed marine seismic components;

(d) computing a difference between the positional setpoint data and the received first set of process data;

(e) measuring a disturbance affecting a course of the first and second towed marine seismic components, the measured disturbance represented by disturbance data, wherein the disturbance data is different than the positional setpoint data or the first set of process data, wherein the measured disturbance comprises one or more of a heading of the marine vessel, a speed of the marine vessel, a speed of a current affecting the marine vessel, or a direction of a current affecting the marine vessel, and wherein a percentage or portion of the measured disturbance value is used to immediately effect changes in control signal to the steering actuator to respond to measurable disturbances before effects of the measurable disturbances are recognized in a feedback loop;

(f) generating control commands for steering each of the first and second towed marine seismic components based on the computed difference between the positional setpoint data and the first set of process data;

g) calculating an anticipated impact of the measured disturbance data on a course of the first and second towed marine seismic components as compared to the positional setpoint data, wherein the calculated anticipated impact is a quotient with the measured disturbance data in a numerator and the first set of process data in a denominator;

(h) adjusting the control commands based upon the calculated impact of the measured disturbance data;

(1) implementing the adjusted control commends by individually steering each of the first and second towed marine seismic components based on the adjusted control commands;

(j) once the adjusted control commands have been implemented, compute computing the anticipated results of the adjusted control commands on the steering of the first and second towed marine seismic components in order to generate a second process data set;

(k) modifying the second process data set utilizing the disturbance data (U); and thereafter, (l) utilizing the modified second process data in step (c) and repeating steps (d)-(l).

14. The method of claim 13, further comprising:

determining a distance between the first towed marine seismic component and the second towed marine seismic component; and when the determined distance between the first towed marine seismic component and the second towed marine seismic component is less than a predetermined separation distance, interrupting use of the adjusted control signal to steer at least one of the first towed marine seismic component and second towed marine seismic component.

15. The method of claim 14, further comprising:

following adjustment of the control signal, comparing the geographic position of the at least one towed marine seismic component to the positional setpoint data to determine an error value with respect to the position of the at least one towed marine seismic component; and utilizing the error value and the disturbance value to generate the second set of process data.

* * * * *